(12) United States Patent
Zink et al.

(10) Patent No.: US 11,007,967 B2
(45) Date of Patent: May 18, 2021

(54) FRONT AIRBAG FOR A VEHICLE OCCUPANT

(71) Applicant: TRW Automotive GmbH, Alfdorf (DE)

(72) Inventors: Lothar Zink, Alfdorf (DE); Bernd Issler, Schorndorf (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 54 days.

(21) Appl. No.: 16/340,802

(22) PCT Filed: Oct. 11, 2017

(86) PCT No.: PCT/EP2017/075965
§ 371 (c)(1),
(2) Date: Apr. 10, 2019

(87) PCT Pub. No.: WO2018/069407
PCT Pub. Date: Apr. 19, 2018

(65) Prior Publication Data
US 2020/0039460 A1 Feb. 6, 2020

(30) Foreign Application Priority Data
Oct. 12, 2016 (DE) .......................... 102016119387.9

(51) Int. Cl.
*B60R 21/233* (2006.01)
*B60R 21/2338* (2011.01)
*B60R 21/205* (2011.01)

(52) U.S. Cl.
CPC ........ *B60R 21/233* (2013.01); *B60R 21/2338* (2013.01); *B60R 21/205* (2013.01)

(58) Field of Classification Search
CPC ........................... B60R 21/233; B60R 21/231
See application file for complete search history.

(56) References Cited

U.S. PATENT DOCUMENTS 3,843,150 A * 10/1974 Harada ................. B60R 21/231
280/729
6,308,983 B1 * 10/2001 Sinnhuber ............. B60R 21/233
280/735

(Continued)

FOREIGN PATENT DOCUMENTS

DE 102018109382 A1 * 10/2019 ........... B60R 21/231
EP 1439096 7/2004

*Primary Examiner* — Faye M Fleming
(74) *Attorney, Agent, or Firm* — Tarolli, Sundheim, Covell & Tummino LLP

(57) ABSTRACT

A front airbag (10) for a vehicle occupant (12), especially a passenger airbag, comprises a contact panel (22) facing the vehicle occupant (12) in the inflated state, wherein in the interior of the airbag at the contact panel (22) first tensile means (32) are arranged which in portions retain the contact panel (22) in the inflated state of the airbag (10) and are disposed so that the contact panel (22) forms a side bulge on at least one of its two lateral edges and forms plural central bulges between the lateral edges which central bulges are smaller in cross-section than the at least one side bulge. At least a second tensile means (38) is disposed so that the contact panel (22) forms an upper bulge (36) which substantially extends in the transverse vehicle direction (y) and, with respect to a vertical vehicle axis (z), is disposed above the central bulges.

20 Claims, 2 Drawing Sheets

(56) References Cited

U.S. PATENT DOCUMENTS

| | | | | |
|---|---|---|---|---|
| 6,962,363 B2* | 11/2005 | Wang | .................... | B60R 21/233 |
| | | | | 280/729 |
| 7,377,548 B2* | 5/2008 | Bauer | ................... | B60R 21/231 |
| | | | | 280/743.2 |
| 9,840,223 B2* | 12/2017 | Choi | ..................... | B60R 21/233 |
| 9,925,948 B2* | 3/2018 | Hotta | .................... | B60R 21/235 |
| 10,065,594 B2* | 9/2018 | Fukawatase | ........ | B60R 21/2338 |
| 10,293,775 B2* | 5/2019 | Wang | ................... | B60R 21/205 |
| 10,632,957 B2* | 4/2020 | Bausch | ............... | B60R 21/2338 |
| 10,661,746 B2* | 5/2020 | Yamada | ................ | B60R 21/205 |
| 2014/0015230 A1 | 1/2014 | Le Norcy et al. | | |
| 2015/0307055 A1 | 10/2015 | Cheng et al. | | |
| 2018/0354447 A1* | 12/2018 | Nakajima | .............. | B60R 21/231 |
| 2018/0354450 A1* | 12/2018 | Yamada | ............ | B60R 21/23138 |
| 2019/0283702 A1* | 9/2019 | Yamada | ................ | B60R 21/233 |
| 2019/0351862 A1* | 11/2019 | Aranzulla | ............. | B60R 21/231 |
| 2020/0010044 A1* | 1/2020 | Yamada | ............... | B60R 21/233 |
| 2020/0122677 A1* | 4/2020 | Yamada | ................ | B60R 21/216 |

* cited by examiner

FRONT AIRBAG FOR A VEHICLE OCCUPANT

RELATED APPLICATIONS

This application corresponds to PCT/EP2017/075965, filed Oct. 11, 2017, which claims the benefit of German Application No. 10 2016 119 387.9, filed Oct. 12, 2016, the subject matter of which are incorporated herein by reference in their entirety.

BACKGROUND OF THE INVENTION

The invention relates to a front airbag for a vehicle occupant, especially a passenger airbag, which offers protection in the case of frontal impact.

Front airbags, especially for passengers, are accommodated in the instrument panel of the vehicle and in the case of restraint exit the instrument panel to extend in the direction of the occupant. The part of the airbag panel which in the inflated state faces and is contacted by the vehicle occupant is referred to as contact panel.

It is generally known to arrange tensile means, usually in the form of tethers, in airbags so as to impart a particular shape to the airbag, i.e. to prevent particular portions of the airbag panel from free unhindered movement during deployment.

In the case of front airbags, it is moreover crucial to guarantee sufficient protection not only in the event of frontal impact but also in the event of diagonal impact. When the occupant's head impacts on the contact panel, with a diagonal impact it is theoretically possible that the head first contacts the relatively hard contact panel and then bends due to the diagonal movement.

In addition, it is desirable to minimize the loads occurring in the neck area when the occupant immerses into the airbag.

SUMMARY OF THE INVENTION

It is therefore the object of the present invention to provide a front airbag for a vehicle occupant, especially a passenger airbag, in such a manner that it is capable of offering proper protection in the case of diagonal impact as well as improved neck load values.

According to the invention, this is achieved by a front airbag for a vehicle occupant, especially a passenger airbag, comprising a contact panel facing the vehicle occupant in the inflated state, wherein in the airbag interior at the contact panel first tensile means are arranged which retain the contact panel in portions in the inflated state of the airbag and are disposed so that the contact panel forms a side bulge on at least one of its two lateral edges and forms plural central bulges between the lateral edges, wherein the central bulges are smaller in cross-section than the at least one side bulge, and wherein at least a second tensile means is disposed so that the contact panel forms an upper bulge extending substantially in the transverse vehicle direction and being disposed above the central bulges with respect to a vertical vehicle axis.

The lateral edges are the boundaries arranged on the left and on the right, when viewed from the vehicle occupant, which delimit the contact panel. The side bulge(s) accordingly extend(s) substantially from the top to the bottom, depending on the shape of the contact panel, and additionally in the longitudinal vehicle direction, where necessary. By the central bulges smaller in cross-section a less hard retaining surface is produced than by the side bulges so that the vehicle occupant can immerse with his/her head into the central portion of the contact panel between the lateral edges. The lower fabric tension of the smaller central bulges—as compared to the side bulge—helps to reduce or prevent rotation of the head in the case of diagonal impact. The lower fabric tension of the central bulges enables fabric to be so-to-speak additionally provided in the transverse direction in the case of diagonal impact instead of permitting no or less displacement of fabric in the transverse direction as in the case of high fabric tension. Said displacement of fabric and, resp., additional provision of fabric in the transverse direction reduces the rotational forces acting on the head and, resp., the chest of the occupant. The side bulge or, resp., the two side bulges then constitute(s) additional protection against lateral movement of the head and the chest of the occupant in the event of diagonal impact. Due to the side bulge which is larger in cross-section, the head at said position is better wrapped by the fabric than on the other side of the head by the central bulges having a smaller cross-section, thus causing the undesired rotation of the head to be further reduced. The upper bulge extending above the central bulges in addition provides an upwardly increased airbag, which is beneficial especially in the case of a tall vehicle occupant, mainly in an unbuckled load case. In addition, said upper bulge helps to reduce the loads in the neck area of the occupant.

Particularly efficient protection can be achieved in the case of an occupant immersing into the airbag close to the lateral edge, when the upper bulge is disposed above the at least one side bulge.

According to a preferred embodiment, the upper bulge extends over the entire horizontal width of the airbag, especially a constriction formed by the second tensile means extends over the full horizontal width of the contact panel. In this way, the neck load values can be minimized especially for a tall vehicle occupant.

In order to efficiently prevent neck rotation of occupants of most different size in the case of diagonal impact, preferably at least one constriction formed by a first tensile means extends over a major part of the remaining height, especially over at least two thirds of the remaining height, of the contact panel beneath the upper bulge. Especially all constrictions formed by the first tensile means extend over a major part of the remaining height, especially over at least two thirds of the remaining height, of the contact panel beneath the upper bulge. Then, in a major part of the area of the contact panel located beneath the upper bulge, the airbag is divided into plural central bulges and at least one side bulge. Of course, the constrictions formed by the first tensile means may extend even over the entire remaining height beneath the upper bulge.

Particularly low load values can be achieved when the second tensile means delimits an upper area of the airbag located behind the upper bulge, when viewed from the vehicle occupant, which has a volume of approx. 3 to 10%, especially approx. 5% of the total volume of the airbag. The second tensile means need not imperatively separate the upper area completely from the remaining airbag; there may definitely be a fluid connection between the upper area and the remainder of the airbag.

Preferably, at least some of the bulges extend substantially part-cylindrically in the area of the contact panel.

In a preferred configuration, the upper bulge has a maximum width measured vertically and transversely to the longitudinal vehicle axis which corresponds at least to the maximum width measured horizontally and transversely to the longitudinal vehicle axis of the at least one side bulge whose maximum width is larger especially by the factor 1.5, preferably by at least the factor 1.75, than the maximum width of the central bulges. Such airbag particularly efficiently reduces the neck loads occurring in the vehicle occupant in the case of restraint.

In addition, or as an alternative, the at least one side bulge moreover has a depth measured from the contact panel-side end of its adjacent tensile means in the longitudinal vehicle direction which is larger by at least the factor 1.25, especially by at least the factor 1.5, than the depth of the central bulges.

By the differently large bulges the surface formed by the contact panel includes differently hard and soft portions even in the case of one single inflatable chamber of the airbag so that specifically softer portions can be produced into which the vehicle occupant can immerse or into which the occupant can be moved when he/she initially impacts on adjacent harder portions. When the airbag includes one single inflatable chamber and thus the internal airbag pressure is equal throughout, in the contact panel lower surface tensions which prevent the vehicle occupant from immersing, occur in the area of the central bulges as compared to higher surface tensions of the side bulge or side bulges and/or of the upper bulge.

In general, the contact panel should be harder in the area of the side bulges and, where necessary, in the area of the upper bulge than in the area of the central bulges. This can be achieved solely by selecting the geometry of the bulges, i.e. the contact panel in combination with the tensile means, and/or by different internal pressures in the area of the different bulges.

One preferred embodiment of the invention provides that the second tensile means is in the form of an intermediate panel which preferably extends substantially over the entire width and depth of the airbag.

In this case, the upper bulge is formed especially by a separate chamber and is independent of the at least one side bulge and of the central bulges. In this way, an internal pressure and thus a hardness of the upper bulge different from that of the at least one side bulge and the central bulges can be especially easily adjusted.

Alternatively, it is imaginable to design the second tensile means as tether so that the airbag has only one single large chamber or that a fluid connection is provided at the edge of an intermediate panel.

At least several tensile means may be tethers which can be quite easily stitched to the airbag panel.

In addition, the at least one side bulge and the central bulges may be formed by one single inflatable chamber. Of course, also the entire airbag including the upper bulge may comprise one single chamber only.

In a preferred embodiment, at least several of the first tensile means are intermediate panels which divide especially the interior of the airbag into different chambers. The individual chambers may be designed differently from each other, which allows to optionally inflate the chambers at different times and/or to fill them with different internal pressures. Preferably, however, the intermediate panels are designed such that they do not fully extend to the edge of the airbag so that there is a fluid connection between the different chambers. Thus, in the case of restraint, the same internal pressure is reached in all chambers.

According to a particularly preferred configuration, the first tensile means are formed by plural first intermediate panels arranged in parallel and next to each other in the transverse vehicle direction as well as by a joint second intermediate panel, wherein the first intermediate panels are fastened at an angle of from 60 to 90, especially about 90°, to an edge of the second intermediate panel facing the vehicle occupant. In this configuration, especially long bulges are easily formed in the fastening area of the first intermediate panels at the contact panel beneath the upper bulge. The first intermediate panels do not continuously extend over the full depth of the airbag up to the rear panel thereof, however, but are connected to the rear panel via the joint second intermediate panel. In this way, the chambers which are located behind the central bulges and the at least one side bulge and which are delimited in portions by the first side panels, are fluid-connected to each other, thus allowing an identical internal pressure to be reached in the central bulges and in the at least one side bulge.

Of preference, the second intermediate panel extends substantially in parallel to the second tensile means which especially is also configured as an intermediate panel. Alternatively, also a slightly inclined orientation of the second intermediate panel with respect to the second tensile means is possible.

Alternatively, the interior of the airbag may be divided by the tensile means into different chambers which are formed so that in the inflated state they have different internal pressures, wherein especially the internal pressure of at least one central chamber is lower than the internal pressure of at least one lateral chamber. Thus, also in this case the lateral chambers prevent displacement of the occupant at the contact panel. The occupant then is positioned in the center, as with a trampoline. Moreover, also in this case the resistance to immersion is higher in the area of the side bulges and of the upper bulge than in the area of the central bulges. This, too, reduces or even prevents rotation of the head.

A simple constructional design is resulting when the tensile means are fastened to a rear panel opposed to the contact panel which especially includes mounting holes for attaching the airbag to the module side. Thus, the tensile means extend substantially in the longitudinal vehicle direction.

The front airbag according to the invention usually is part of an airbag module which moreover includes an inflator. When the airbag is divided into different independent chambers, the inflator may be connected to the interior of the airbag so that the chambers are inflated to a different degree and have different internal pressures.

BRIEF DESCRIPTION OF THE DRAWINGS

Further features and advantages of the invention will be evident from the following description by way of the enclosed drawings, wherein.

DESCRIPTION

The Figures illustrate a front airbag 10 according to the invention, more exactly a front passenger airbag, in the mounted and completely inflated state which serves for protecting a vehicle occupant 12, with merely the head of said occupant being indicated in the Figures.

Depending on the size of the vehicle occupant 12 and on the type of impact, the head of the vehicle occupant 12 may impact on the airbag 10 at different positions, wherein 12a illustrates the head position for a tall vehicle occupant, 12b illustrates the head position for a short vehicle occupant and 12c illustrates the head position in the case of diagonal impact.

In the Figures, the longitudinal vehicle direction corresponding to the driving direction bears the coordinate x and the transverse vehicle direction corresponding to the horizontal direction bears the coordinate y. The vertical vehicle axis is denoted with z.

Figure 1:
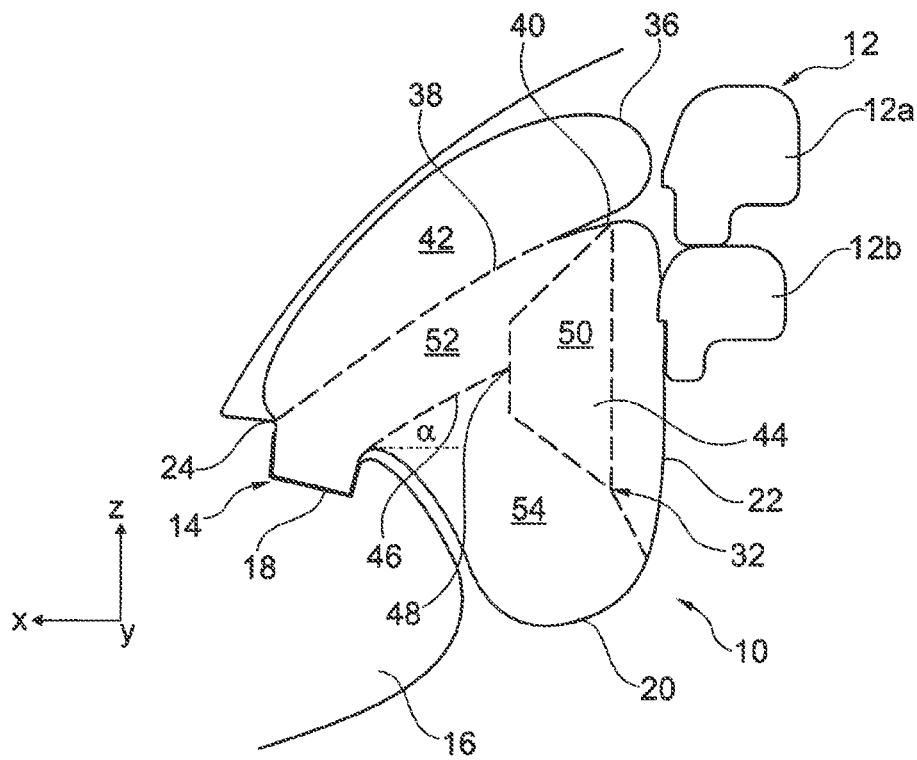
FIG. 1 shows a partly transparent lateral view of a front airbag according to the invention in the mounted and inflated state.

The front airbag 10 is part of an airbag module 14 of which merely a module housing 18 arranged on the passenger side in the instrument panel 16 is indicated in FIG. 1. In the folded state, the airbag 10 is accommodated in the module housing 18.

The front airbag 10 has an outer panel 20 made from fabric material and comprising plural portions, with the portion facing the vehicle occupant 12 in the inflated state being referred to as contact panel 22. Moreover, there is a rear panel 24 opposed to the contact panel 22 which is fastened on the module side, for example via mounting holes.

The contact panel 22 has two lateral edges 26, when viewed from the vehicle occupant 12, each including a side bulge 28 extending toward the vehicle occupant 12 opposite to the driving direction x. The side bulges 28 constitute the lateral ends of the contact panel 22. Between the lateral edges 26, more exactly between the two side bulges 28, plural, in this case two, central bulges 30 are formed. The central bulges 30 are smaller in cross-section than the side bulges 28, as is evident especially from the top view in FIG. 3.

Said division of the contact panel 22 into side bulges 28 and central bulges 30 is produced by first tensile means 32 arranged inside the airbag 10 which are attached to the contact panel 22 and retain the contact panel 22 in portions in the inflated state of the airbag 10. For this purpose, the first tensile means 32 are fastened to the contact panel 22 by their end close to the vehicle occupant 12 and there result in a constriction 34. At their opposite ends, the first tensile means 32 are fastened to the rear panel 24.

Figure 3:
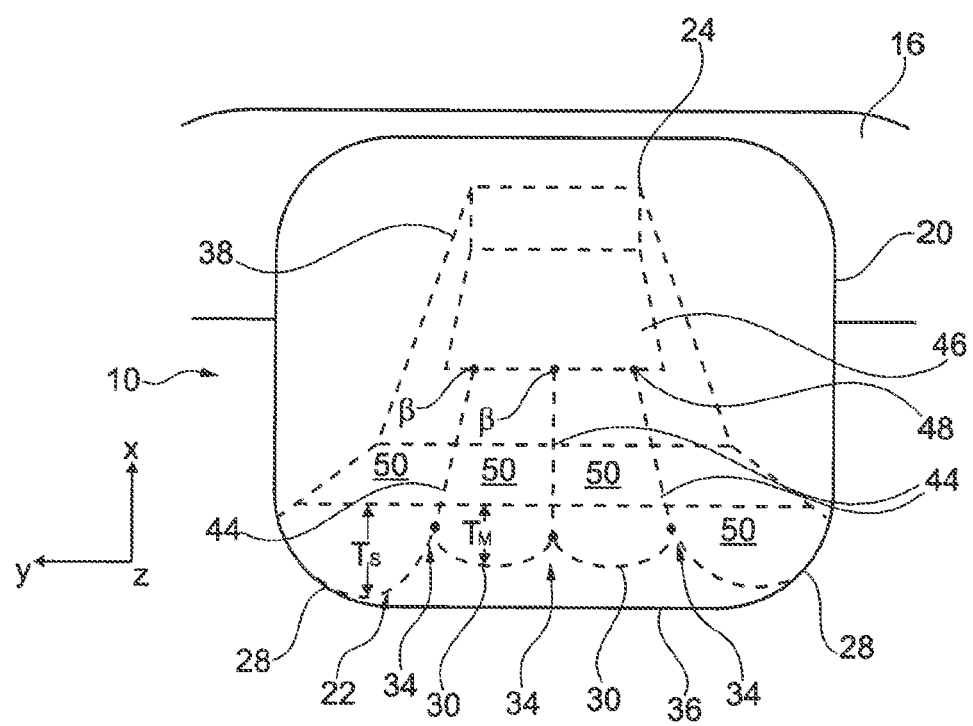
FIG. 3 shows a partly transparent top view onto the front airbag from FIG. 1.

As can be inferred especially from FIGS. 1 and 3, the first tensile means 32 are formed by plural (here three) first intermediate panels 44 arranged in parallel and next to each other in the transverse vehicle direction y as well as by a joint second intermediate panel 46 which extends at an angle $\alpha$ of about 30° with the horizontal plane spanned by the longitudinal vehicle direction x and the transverse vehicle direction y (FIG. 1). The first intermediate panels 44 are fastened at an angle $\beta$ of 60 to 90°, here especially about 90°, to an edge 48 of the second intermediate panel 46 facing the vehicle occupant 12 (FIG. 3). In this way, plural sub-chambers 50 located behind the side bulges 28 and, resp., the central bulges 30, when viewed from the vehicle occupant 12, are formed at least in portions inside the airbag 10, said sub-chambers 50 being open toward the areas 52, 54 of the airbag 10 located beneath and behind the sub-chambers 50, however, so that in the inflated state all sub-chambers 50 have the same internal pressure. Hence, in this configuration the side bulges 28 and the central bulges 30 are virtually formed by one single inflatable chamber having plural sub-chambers 50 and, resp., areas 52, 54.

Alternatively, some of the first tensile means 32 or all of the first tensile means 32 may be intermediate panels, each extending to the edge of the airbag 10 so that the airbag interior is divided into different separate chambers by the tensile means 32. The chambers may be formed so that in the inflated state they have different internal pressures, wherein especially the internal pressure of at least one central chamber is lower than the internal pressure of at least one lateral chamber. It is likewise imaginable to design the first tensile means 32 as tethers. Furthermore, generally intermediate panels may be provided which are braced by means of tethers.

Apart from the side bulges 28 and the central bulges 30, the contact panel 22 further includes an upper bulge 36 which extends substantially in the transverse vehicle direction y and is arranged, with respect to the vertical vehicle axis z, above the central bulges 30. In the illustrated configuration, the upper bulge 36 is additionally arranged above the side bulges 28 and thus extends over the entire horizontal width of the airbag 10.

The upper bulge 36 is formed by providing a second tensile means 38 in the form of an intermediate panel inside the airbag 10, which second tensile means is connected and, resp., fastened to the contact panel 22 at its end facing the vehicle occupant 12 and, there, results in a constriction 40 extending over the entire horizontal width of the contact panel 22. The opposite end of the second tensile means 38 is equally fastened to the rear panel 24 of the airbag 10.

The second tensile means 38 which in this case extends as an intermediate panel substantially over the entire width and depth of the airbag 10 delimits an upper area 42 of the airbag 10. Said upper area 42 has a volume which amounts to approx. 3 to 10%, especially approx. 5% of the total volume of the airbag 10 and is located, when viewed from the vehicle occupant 12, behind the upper bulge 36. Even if the second tensile means 38 is in the form of an intermediate panel, there may be a fluid connection between the upper area 42 and the remainder of the airbag 10. It is not imperative that the second tensile means 38 completely fluidically disconnects the upper area 42; especially at the edge of the airbag 10 there may be a passage for the gas. Alternatively, the upper bulge 36 may be formed by an independent separate chamber and may be fluidically independent of the side bulges 28 and the central bulges 30.

As is evident from FIG. 1, the second tensile means 38 configured as an intermediate panel extends substantially in parallel to the second intermediate panel 46 of the first tensile means 32. Alternatively, the second intermediate panel 46 and the second tensile means 38 may also extend slightly inclined relative to each other, of course.

As an alternative to the shown configuration, the second tensile means 38 may as well include one or more tethers so that the airbag 10 on the whole has only one single large chamber.

Figure 2:
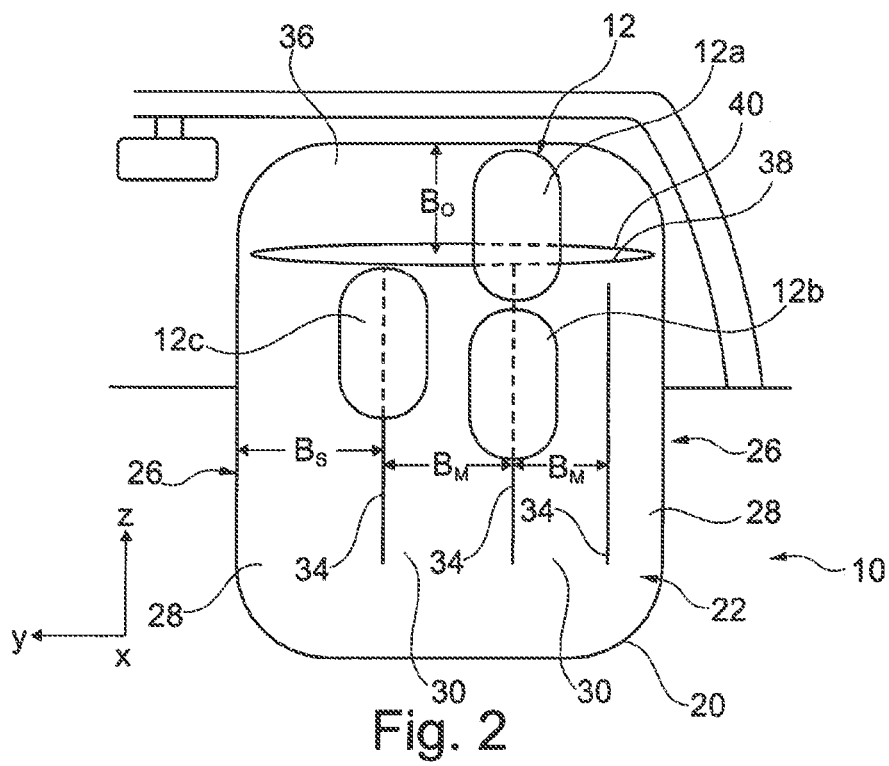
FIG. 2 shows a partly transparent front view of the front airbag from FIG. 1 when viewed from a passenger seat.

As is evident from FIGS. 1 to 3, the bulges 28, 30 and 36 extend substantially part-cylindrically in the area of the contact panel 22.

The central bulges 30 are smaller in cross-section than the side bulges 28. The upper bulge 36 has a maximum width $B_O$ measured vertically and transversely to the longitudinal vehicle direction x which corresponds at least to the maximum width $B_S$ measured horizontally and transversely to the longitudinal vehicle axis x of the side bulges 28 whose maximum width $B_S$ in turn is larger especially by the factor 1.5, preferably by at least the factor 1.75, than the maximum width $B_M$ of the central bulges 30. In this context, it is pointed at the fact that the respective representation in the Figures is not true to scale.

Moreover, the depth $T_S$ of the side bulges 28 measured in the longitudinal vehicle direction is larger at least by the factor 1.25, especially by at least the factor 1.5, than the depth $T_M$ of the central bulges. The depth of the bulges is measured from the contact panel-side end of the adjacent tensile means 32 to the maximum extension in the direction of the vehicle occupant 12.

The constrictions 34 formed by the first tensile means 32 extend over a major part of the remaining height (here slightly more than two thirds of the remaining height) of the contact panel 22 beneath the upper bulge 36 so that in a large area of the contact panel 22 the airbag 10 is divided into the side bulges 28 and the central bulges 30.

Since in the area of the side bulges 28 and of the central bulges 30 de facto only one single inflatable chamber is present due to the arrangement of the first and second intermediate panels 44, 46, the internal pressure after inflating the airbag 10 is equal throughout this area. Because of the different curvatures and different sizes of the bulges 28, 30, the contact panel 22 has a higher surface tension in the area of the side bulges 28 than in the area of the central bulges 30.

In addition, also in the area of the upper bulge 36 a higher surface tension and/or a higher internal pressure may be provided (with a completely separately formed area 42). As a consequence, immersion is easier in the area of the central bulges 30 than in the area of the side bulges 28 and, resp., of the upper bulge 36. Thus, in the case of diagonal impact, the vehicle occupant will immerse more easily in the area of the central bulges 30, which enables his/her head to be stabilized against lateral rotation. The side bulges 28 serve for imparting stability to the airbag 10 and additionally for excluding slipping off the contact panel 22. The upper bulge 36 moreover serves for improving the neck load values, especially for a tall occupant whose head is in the upper head position 12a shown in FIGS. 1 and, resp., 2.

Instead of two side bulges 28, the airbag 10 may include only one side bulge 28 which then is located at the lateral edge close to the side window which is assigned to the vehicle occupant 12.

The invention claimed is:

1. A front airbag for a vehicle occupant (12), comprising a contact panel (22) facing the vehicle occupant (12) in the inflated state, wherein in the interior of the airbag at the contact panel (22) first tensile means (32) are arranged which in portions retain the contact panel (22) in the inflated state of the airbag (10) and are disposed so that the contact panel (22) forms a side bulge (28) on at least one of its two lateral edges (26) and forms plural central bulges (30) between the lateral edges (26), wherein the central bulges (30) are smaller in cross-section than the at least one side bulge (28), and wherein at least a second tensile means (38) is disposed so that the contact panel (22) forms an upper bulge (36) which substantially extends in the transverse vehicle direction (y) and, with respect to a vertical vehicle axis (z), is disposed above the central bulges (30).

2. The front airbag according to claim 1, wherein the upper bulge (36) is arranged above the at least one side bulge (28).

3. The front airbag according to claim 1, wherein the upper bulge (36) extends over the entire horizontal width of the airbag (10).

4. The front airbag according to claim 1, wherein at least one constriction (34) formed by a first tensile means (32) extends over a majority of the remaining height of the contact panel (22) beneath the upper bulge (36).

5. The front airbag according to claim 1, wherein the second tensile means (38) delimits an upper area (42) of the airbag (10) located behind the upper bulge (36), when viewed from the vehicle occupant (12), which has a volume amounting to approximately 3 to 10% of the total volume of the airbag (10).

6. The front airbag according to claim 1, wherein at least some of the bulges (28, 30, 36) extend substantially part-cylindrically in the area of the contact panel (22).

7. The front airbag according to claim 1, wherein the upper bulge (36) has a maximum width ($B_O$) measured vertically and transversely to the longitudinal vehicle axis (x) which corresponds at least to the maximum width ($B_S$) measured horizontally and transversely to the longitudinal vehicle axis (x) of the at least one side bulge (28) whose maximum width ($B_S$) is large by at least the factor 1.5 than the maximum width ($B_M$) of the central bulges (30).

8. The front airbag according to claim 1, wherein the second tensile means (38) is in the form of an intermediate panel which extends substantially over the entire width and depth of the airbag (10).

9. The front airbag according to claim 8, wherein the upper bulge (36) is formed by an independent separate chamber and is independent of the at least one side bulge (28) and the central bulges (30).

10. The front airbag according to claim 1, wherein at least some tensile means are tethers.

11. The front airbag according to claim 1, wherein the at least one side bulge (28) and the central bulges (30) are formed by one single inflatable chamber.

12. The front airbag according to claim 1, wherein at least some of the first tensile means (32) are intermediate panels (44, 46) which divide the interior of the airbag into different chambers (50, 52, 54).

13. The front airbag according to claim 12, wherein the first tensile means (32) are formed by plural first intermediate panels (44) arranged in parallel and next to each other in the transverse vehicle direction as well as by a joint second intermediate panel (46), wherein the first intermediate panels (44) are fastened at an angle (β) of from 60 to 90° to an edge (48) of the second intermediate panel (46) facing the vehicle occupant (12).

14. The front airbag according to claim 13, wherein the second intermediate panel (46) extends substantially in parallel to the second tensile means (38).

15. The front airbag according to claim 1, wherein the airbag interior is divided by the tensile means (32, 38) into different chambers which are configured so that in the inflated state they have different internal pressures, wherein the internal pressure of at least one central chamber is lower than the internal pressure of at least one lateral chamber.

16. The front airbag according to claim 1, wherein the tensile means (32, 38) are fastened to a rear panel (24) opposed to the contact panel (22) which includes mounting holes for attaching the airbag (10) to the module side.

17. The front airbag according to claim 1 wherein a constriction (40) formed by the second tensile means (38) extends over the entire horizontal width of the contact panel (22).

18. The front airbag according to claim 1, wherein all constrictions (34) formed by the first tensile means (32) extend over a majority of the remaining height of the contact panel (22) beneath the upper bulge (36).

19. The front airbag according to claim 13, wherein the second intermediate panel (46) extends substantially in parallel to the second tensile means (38) which is in the form of an intermediate panel.

20. The front airbag according to claim 13, wherein the front airbag is a passenger airbag.

* * * * *